April 2, 1940.  H. A. WHEELER  2,195,438

COUPLING SYSTEM

Filed Sept. 9, 1936  2 Sheets-Sheet 1

INVENTOR.
HAROLD A. WHEELER
BY Laurence B Dodds
ATTORNEY.

April 2, 1940.  H. A. WHEELER  2,195,438
COUPLING SYSTEM
Filed Sept. 9, 1936   2 Sheets—Sheet 2

INVENTOR.
HAROLD A. WHEELER
BY Laurence B Dodds
ATTORNEY.

Patented Apr. 2, 1940

2,195,438

UNITED STATES PATENT OFFICE

2,195,438

COUPLING SYSTEM

Harold A. Wheeler, Great Neck, N. Y., assignor to Hazeltine Corporation, a corporation of Delaware Application September 9, 1936, Serial No. 99,966

6 Claims. (Cl. 179—171)

This invention relates to electrical circuit arrangements, and more particularly to such arrangements in which unidirective coupling means are so connected and arranged as to obtain the equivalent of mutual reactance coupling between two or more electrical circuits.

Nondirective coupling between a pair of circuits is generally understood to be that form of coupling in which the impedance reactions between the coupling circuits are the same in both directions of coupling as distinguished from mutual reactance generally, wherein the impedance reactions in the two directions of coupling may not be of the same magnitude. Nondirective coupling is exemplified by a pair of circuits having mutual inductive or capacitive coupling therebetween and, also, by a pair of circuits coupled by the self-impedance of an inductance, capacitance, or resistance element or elements. These universally utilized forms of coupling are characterized by certain inherent limitations which, while objectionable, have been accepted in all branches of circuit analysis and design. One such limitation is that the coefficient of coupling is limited to a value not to exceed unity. This particular limitation is of importance in the design of wide band-pass selectors. Another limitation concerns the effect of adjustments of coupling on the coupled circuits, such adjustments inherently producing a change in the self-impedance characteristics of the coupled circuits, which change, in many instances, is undesirable.

Conventional forms of mutual impedance coupling are also open to the criticism that adjustment of the amount of coupling can only be secured by arrangements including mechanically movable parts. In general, this entails the use of complicated and expensive precision apparatus which, at best, is susceptible to changes in impedance characteristics with wear, age, and other factors.

It is an object of the present invention, therefore, to provide an improved electric circuit arrangement for securing the equivalent of mutual reactance coupling, between two or more circuits in both directions of coupling, which is free of the limitations on conventional forms of coupling set forth above.

It is a further object of the invention to provide an improved circuit arrangement of the above character in which the coupling in each direction of coupling is the same, whereby the exact equivalent of nondirective mutual reactance coupling is obtained.

More specifically, it is an object of the invention to provide an improved simple and inexpensive electric circuit arrangement for securing the equivalent of mutual reactance coupling between two or more circuits which is easily adjustable by nonmechanical means to vary the coupling between the coupled circuits without varying the self-reactance characteristics of the circuits, is not limited to a coupling coefficient having an upper limit of unity, and is stable in operation.

The invention, as hereinafter described in detail, is illustrated in its application to coupling systems including untuned input and output circuits and, also, to coupling systems including tuned or frequency-selective terminal circuits. Briefly, the objects of the invention are realized by employing unidirective coupling means, such as vacuum tubes, to couple the terminal circuits in both directions of coupling; the directions of coupling being designated forward and backward to indicate the effect of the input circuit on the output circuit and vice versa. Equivalence to mutual reactance coupling is secured by providing phase-shifting means in at least a portion of the coupling paths between the unidirective coupling means and the associated terminal circuits which cooperate with the unidirective coupling means to provide phase relations between the voltages and currents in the circuits equivalent to those which would be provided by mutual reactance therebetween. Stability of operation is ensured either by the expedient of using vacuum tubes having negligible input-output electrode admittance, or by providing means in the coupling circuits for neutralizing such incidental admittance inherent in unshielded tubes. With the arrangement briefly described above, the coupling in each of the two directions of coupling is proportional to the value of transconductance of the corresponding unidirective coupling means. Where vacuum tubes are employed as the coupling means, adjustment of the transconductance thereof to vary the coupling is accomplished by adjusting the control bias applied to control electrodes of the forward and backward coupling tubes and, since the coupling is limited only by the range of variation of the transconductances of these tubes, the coefficient of coupling is not restricted to a value approaching unity as a limit.

Exact equivalence to nondirective mutual reactance is attained by maintaining equal the transfer impedance or transconductance coupling the circuits in the forward direction and that coupling the circuits in the backward direction. Where adjustment of the coupling is desired without departing from this exact equivalence to nondirective mutual reactance, the transfer impedances of the two unidirective coupling means are varied together, as, for example, by varying the coupling tube biases simultaneously and in the correct ratio.

In the specific application of the invention to selector systems embodying tuned terminal circuits, the use of the unidirective coupling means to adjust the coupling between the circuits provides an arrangement particularly susceptible to automatic control of the frequency-response characteristic of the system. By selecting tubes of the proper type as the unidirective coupling means, as, for example, tubes having conductance proportional to transconductance, the conductance may be utilized to determine the damping of one or both of the terminal circuits. This feature is desirable where the selector systems are to be used as adjustable band-pass selectors to determine the selectivity of radio broadcast receivers, for example, since it permits the width of the transmitted frequency band to be varied without otherwise altering the shape of the frequency-response characteristic thereof.

In accordance with a specific embodiment of the invention, an electric coupling system comprises input and output circuits and separate unidirective nondissipative coupling means coupling the circuits individually in the forward and backward directions. At least one of the coupling means comprises a pair of vacuum tubes coupled in cascade between the circuits, and means are provided including a reactance in the coupling path between the pair of tubes and cooperating with the unidirective coupling means to provide phase relations between the voltages and currents in the circuits equivalent to those which would be provided by mutual reactance between the circuits.

In accordance with another specific embodiment of the invention, an electric coupling system comprises input and output circuits and a separate unidirective coupling means each coupled to both of the circuits and individually coupling the circuits in the forward and backward directions, each of the coupling means incidentally coupling the circuits in both directions. Means are provided for neutralizing such incidental coupling and there are provided means cooperating with the unidirective coupling means to provide phase relations between the voltages and currents in the circuits equivalent to those which would be provided by mutual reactance between the circuits.

The novel features which are believed to be characteristic of the invention are set forth with particularity in the appended claims. The invention itself, however, both as to its organization and method of operation, together with further objects and advantages thereof, may best be understood by reference to the specification taken in connection with the accompanying drawings, in which Figs. 1, 3, and 7-9, inclusive, illustrate certain embodiments of the invention as applied to coupling systems with untuned terminal circuits; Fig. 2 illustrates a circuit electrically equivalent to the circuit of Fig. 1; Figs. 4-6, inclusive, illustrate the invention as applied to coupling systems with tuned terminal circuits.

Figures 1, 2, 3, 4, 5, 6, 7:
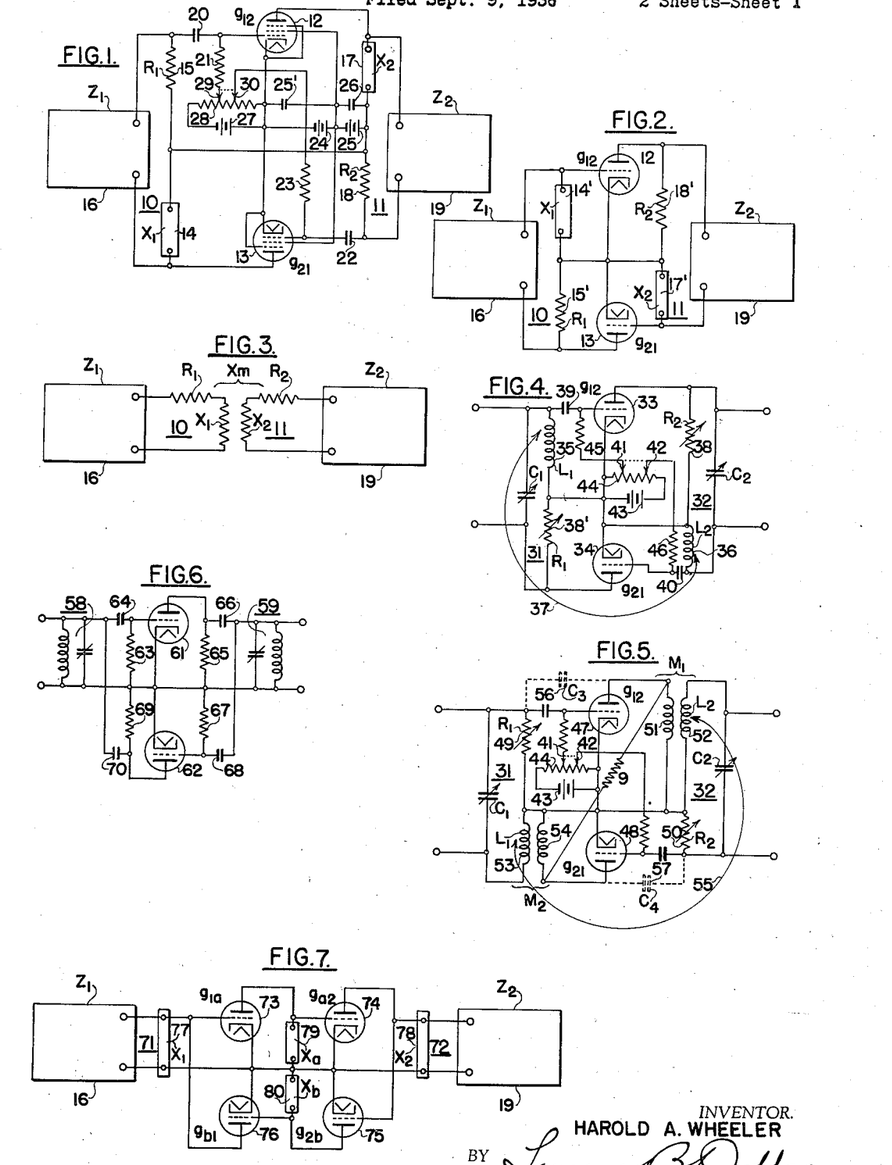

Referring now more particularly to Fig. 1 of the drawings, there is illustrated one embodiment of the invention comprising terminal circuits including an input circuit 10, an output circuit 11, and unidirective coupling means comprising the vacuum tubes 12 and 13 coupling the two circuits in the forward and backward directions, respectively. Preferably, each of the tubes 12 and 13 is of the well-known pentode type having negligible cathode-anode conductance. The input circuit 10 may have any desired self-impedance characteristic and is shown as comprising a reactance element 14, connected in series with a resistor 15 across the terminals of a generalized impedance, indicated at 16, representing the other impedance of the circuit. Similarly, the output circuit 11 may have any desired self-impedance characteristic and comprises a reactance element 17 connected in series with a resistor 18 across the terminals of a generalized impedance, indicated at 19.

The coupling paths between the circuits 10 and 11 and the input and output electrodes of the tube 12 include means for obtaining a quadrature phase relation between the voltage introduced into the circuit 11 by the forward coupling tube and the voltage impressed between the input electrodes of this tube. This means comprises the resistor 15 and the reactance element 17. Similarly, the resistor 18 and the reactance element 14 are included in the coupling paths between the input and output electrodes of the tube 13 and the circuits 11 and 10 for providing a quadrature phase relation between the voltage impressed between the input electrodes of this tube and the voltage introduced by the backward coupling means into the circuit 10. Suitable sources of screen and anode operating potentials, such as batteries 24 and 25, are provided, shunted by high-frequency by-pass condensers 25' and 26, respectively.

In order to adjust the bias of a control electrode of each of the tubes 12 and 13, thereby to vary the transconductances of the tubes and the coupling in the forward and backward directions, respectively, there is provided a voltage source 27 shunted by a voltage dividing resistor 28 having adjustable contacts 29 and 30 connected to the control electrodes of the tubes 12 and 13 through high-frequency blocking resistors 21 and 23, respectively. This source is isolated from the terminal circuits 10 and 11 by means of direct current blocking condensers 20 and 22, respectively. If simultaneous and equal adjustments of the biases applied negatively to these control electrodes are desired, the circuit lead from the control grid of the tube 13 may be connected to the contact 29, as indicated by the dotted line connection, and the contact 30 omitted. With this modification, the forward and backward couplings between the terminal may be simultaneously and equally varied in the same direction, assuming that the characteristics of the tubes 12 and 13 are identical.

In the operation of the coupling arrangement described above, the phase-shifting means cooperate with the unidirectional coupling means comprising the tubes 12 and 13 to provide phase relations between the voltages and currents in the two terminal circuits 10 and 11 exactly equivalent to those which would be provided by mutual reactance coupling between the two circuits, irrespective of the self-impedance characteristics of the terminal circuits 10 and 11. Thus, an alternating voltage impressed across the terminals of the input circuit 10 causes a current to flow through the resistor 15 which develops a voltage across the resistor 15 that is in phase therewith and is impressed between the input electrodes of the forward coupling tube 12 through the coupling condenser 20. The alternating component of the space current of this tube is either in phase with, or in phase opposition to, the voltage across the resistor 15 and, since this current flows through the reactance element 17, the voltage developed across the latter element is displaced in phase by 90 degrees with respect to the voltage across the resistor 15. Hence, the voltage introduced in the output circuit 11 by the forward coupling means either leads or lags behind the current through the resistor 15 by 90 degrees depending on whether the reactance of the element 17 is capacitive or inductive. By a similar physical analysis it may be shown that the voltage introduced in the input circuit 10 by the unidirective backward coupling means including tube 13 either leads or lags behind the current flowing through resistor 18 by 90 degrees. To obtain the equivalent of inductive reactance coupling in each direction of coupling, the reactance elements 14 and 17 should both be inductors, whereas, if the equivalent of capacitive reactance coupling is desired, condensers should be used. It is pointed out that with this symmetrical arrangement, the relative magnitudes of impedance of the elements 15 and 17 and of the elements 18 and 14 in no way affects the quadrature phase relation between the respective voltages introduced in each circuit and the current in the opposite circuits. Consequently, the amount of coupling in each direction of coupling is independent of the frequency of the voltage to be transmitted between the circuits.

The identity of the coupling provided by the unidirective coupling means included in the circuit of Fig. 1 to mutual reactance coupling may be appreciated from an analysis of the circuit of Fig. 3 similar to the analysis given above. In this figure, the terminal circuits 10 and 11 are shown as being coupled by the mutual reactance $X_m$ instead of the tubes 12 and 13, the other portions of the circuit being the same as those of Fig. 1. The reactance $X_m$ may represent mutual inductance, or inductive or capacitive self-reactance coupling. In either case, an alternating voltage applied to the input circuit 10 causes a current to flow through the reactance element common to the circuit 10 and the coupling path, which, by the definition of mutual reactance, induces in the circuit 11 a voltage in phase quadrature with this current. Also, by the definition of mutual reactance, a similar effect occurs in the backward direction. Thus, it will be seen that the phase relations between the voltages and currents is the same for the circuit of Fig. 1 as for that of Fig. 3 and the physical equivalence of the two arrangements is established.

The conditions for complete equivalence to mutual reactance coupling may be shown by a brief examination of the fundamental relations between the constants of the circuit of Fig. 1. By conventional definition, the effective mutual reactance in either direction of coupling is determined by the quotient of the open circuit output voltage and the input current, or:

$$X_{12} = R_1 g_{12} X_2 \quad (1)$$
$$X_{21} = -R_2 g_{21} X_1 \quad (2)$$

where:

$X_{12}$ = mutual reactance in the forward direction.
$X_{21}$ = mutual reactance in the backward direction.
$R_1$ = resistance of element 15.
$R_2$ = resistance of element 18.
$X_1$ = reactance of element 14.
$X_2$ = reactance of element 17.
$g_{12}$ = transconductance of tube 12.
$g_{21}$ = transconductance of tube 13.

The condition for complete equivalence to nondirective mutual reactance is satisfied only when the coupling in the forward direction equals that in the backward direction, or when:

$$X_m = X_{12} = X_{21} = -\sqrt{R_1 R_2 g_{12} g_{21} X_1 X_2} \quad (3)$$

The coefficient of coupling $k$ is given by the equation:

$$k = \frac{X_m}{\sqrt{X_1 X_2}} = -\sqrt{R_1 R_2 g_{12} g_{21}} \quad (4)$$

From Equation (4) it is apparent that the coefficient of coupling is independent of frequency and depends upon the product of the resistance values of the resistors 15 and 18 and the transconductance values of tubes 12 and 13. It is also apparent that variations in the coefficient of coupling may be secured by adjusting the bias voltages applied to the control electrodes of tubes 12 and 13 from the source 27 to vary the transconductances $g_{12}$ and $g_{21}$ thereof, or by varying the resistance values $R_1$ and $R_2$ of resistors 15 and 18. Complete equivalence to nondirective mutual reactance is maintained during such adjustment so long as the conditions specified by Equation (3) are satisfied, or when:

$$R_1 g_{12} X_2 = -R_2 g_{21} X_1 \quad (5)$$

Assuming that tubes 12 and 13 have like characteristics, such equivalence may be maintained by simultaneously adjusting their bias voltages by the same amount and in the same sense in the manner described above.

Referring now to Fig. 2 of the drawings, there is shown a coupling system which is quite similar to that of Fig. 1, differing therefrom only in the manner of arrangement. In the circuit of this figure, the resistance and reactance elements common to the terminal circuits and the coupling paths between the terminal circuits and the unidirective coupling means are interchanged. Thus, the resistors 18' and 15' are connected between the output electrodes and the reactance elements 14' and 17' are connected between the input electrodes of the tubes 12 and 13, respectively. In order to simplify the circuit, the direct current connections and the transconductance adjusting means have been omitted therefrom since their mode of connection is deemed to be apparent from the circuit of Fig. 1. For the same reason, the tubes 12' and 13' have been shown as triodes rather than pentodes.

With the circuit arrangement of Fig. 2, the effective mutual reactance in either direction is given by the equations:

$$X_{12} = -X_1 g_{12} R_2 \quad (6)$$
$$X_{21} = -X_2 g_{21} R_1 \quad (7)$$

and the condition for exact equivalence to nondirective mutual reactance $X_m$ is given by the relations:

$$X_m = X_{12} = X_{21} = \sqrt{X_1 X_2 R_1 R_2 g_{12} g_{21}} \quad (8)$$

The coefficient of coupling for this arrangement thus reduces to the value given by Equation (4) for the arrangement of Fig. 1. The physical operation of the circuit is similar in all respects to that described above in connection with the circuit of Fig. 1; the quadrature phase relation between the current through the element 14' and the voltage introduced in the output circuit across the resistor 18' being obtained in exactly the same manner. A similar quadrature phase relation exists between the current through the element 17' and the voltage across the resistor 15'.

It will be appreciated from the foregoing description of Figs. 1, 2, and 3 that, since the coupling provided by the unidirective forward and backward coupling means is identical with that obtained by mutual reactance coupling, it may be employed to supplement actual nondirective mutual reactance coupling between a pair of circuits. This expedient is of considerable utility in those arrangements where it is desired to adjust the coupling at will, either by manual or automatic control means. Such an arrangement is illustrated in Fig. 4, wherein unidirective coupling means are provided for individually coupling the tuned input and output circuits 31 and 32 in the two directions of coupling and are operative to change the magnitude of the effective mutual reactance between the circuits in the respective directions of coupling without altering the phase of the coupling. These means comprise vacuum tubes 33 and 34, respectively. The terminal circuits are also coupled by the mutual inductive reactance indicated by the curved arrow 37 linking inductors 35 and 36 included in the terminal circuits 31 and 32, respectively. For the purpose of simplifying the circuit, the tubes 33 and 34 have been indicated as triodes but preferably are of the pentode type having a minimum plate conductance. Since the method of connecting the anode and screen voltages is well illustrated in Fig. 1, these sources of voltage and the connections thereto have been omitted from the circuit. As shown, the inductor 35 is included in the coupling path between the input circuit 31 and the input electrodes of the tube 33 and cooperates with an adjustable resistor 38 included in the coupling path between the circuit 32 and the output electrodes of the tube 33 to provide the necessary 90 degree phase displacement between the current through the inductor 35 and the feed-forward voltage across the resistor 38. Similarly, the inductor 36 is included in the coupling path between the input electrodes of the tube 34 and the output circuit 32 and cooperates with a similarly connected adjustable resistor 38' to provide the necessary quadrature phase relation between the current through the inductor 36 and the feed-back voltage across the resistor 38'. Low reactance coupling condensers 39 and 40 are provided respectively in the input paths to the input electrodes of the tubes 33 and 34. The bias voltages applied to the control electrodes of these tubes are determined by the adjustment of contacts 41 and 42 along a voltage dividing resistor 44 which shunts a source of biasing potential 43. Leak resistors 45 and 46 are included respectively in the biasing circuits comprising the connections to the contacts 41 and 42. By adjusting these contacts along the resistor 44, variations in the transconductances of the associated tubes may be obtained, thereby to vary the coupling between the circuits in the manner described in connection with the circuit of Fig. 1 and, by terminating the biasing connections at the same adjustable contact 41 or 42, as indicated by the dotted line connection between these contacts, the bias voltages may be adjusted together.

The physical operation of the unidirective coupling means included in the circuit of Fig. 4 is thought to be evident from the detailed description of the operation of the circuit of Fig. 1, since it is similar thereto in all material respects. In the circuit of Fig. 4, however, the total coupling is composed of two components, namely, the nondirective mutual inductive reactance between the elements 35 and 36 and the adjustable component provided by the two unidirective coupling means. The directive mutual reactance values are:

$$X_{12} = \omega M_{12} - \omega L_1 g_{12} R_2 \quad (9)$$
$$X_{21} = \omega M_{21} - \omega L_2 g_{21} R_1 \quad (10)$$

where:

$X_{12}$ = mutual reactance in the forward direction.
$X_{21}$ = mutual reactance in the backward direction.
$\omega = 2\pi f$.
$M_{12}$ = mutual inductance between inductors 35 and 36 in the forward direction.
$M_{21}$ = mutual inductance between inductors 35 and 36 in the backward direction.
$L_1$ = self-inductance of inductor 35.
$L_2$ = self-inductance of inductor 36.
$g_{12}$ = transconductance of tube 33.
$g_{21}$ = transconductance of tube 34.
$R_1$ = resistance of resistor 38'.
$R_2$ = resistance of resistor 38.

The condition for complete equivalence to nondirective mutual inductance reactance is given by the equation:

$$X_m = \omega M_{12} - X_{12} = \omega M_{21} - X_{21} = \omega(M - \sqrt{L_1 L_2 g_{12} g_{21} R_1 R_2}) \quad (11)$$

The coefficient of coupling is:

$$k = \frac{M}{\sqrt{L_1 L_2}} - \sqrt{R_1 R_2 g_{12} g_{21}} \quad (12)$$

It is noted that the mutual inductance and the vacuum tube coupling are additive when the former is negative according to ordinary conventions and the manner in which the circuit is shown in the drawing. The ratio of $X_m$ to its optimum value is:

$$\frac{|X_m|}{\sqrt{R_1 R_2}} = \frac{|\omega M - \omega\sqrt{L_1 L_2 g_{12} g_{21} R_1 R_2}|}{\sqrt{R_1 R_2}} \quad (13)$$

Although the circuit of Fig. 4 is shown as including nondirective inductive mutual reactance between the tuned terminal circuit supplemented by the coupling provided by the two unidirective coupling means, it will be understood that the coupling between the circuits may consist solely of the latter form of coupling. In this case the directive mutual reactance values and the condition for equivalence to nondirective mutual reactance coupling are:

$$X_{12} = -\omega L_1 g_{12} R_2 \quad (14)$$
$$X_{21} = -\omega L_2 g_{21} R_1 \quad (15)$$
$$X_m = X_{12} = X_{21} = -\omega\sqrt{L_1 L_2 g_{12} g_{21} R_1 R_2} \quad (16)$$

The coefficient of coupling is the same as that given by Equation (4) for the circuit of Fig. 1 and the ratio of $X_m$ to its optimum value is:

$$\frac{|X_m|}{\sqrt{R_1 R_2}} = \omega\sqrt{L_1 L_2 g_{12} g_{21}} \quad (17)$$

The simplest case of unidirective coupling between the tuned terminal circuits 31 and 32 is that of optimum coupling for obtaining a flat-top resonance curve, in which case the following conditions should exist:

$$C_1 = C_2;\ L_1 = L_2;\ g_{12} = g_{21};\ R_1 = R_2 = |X_m| \quad (18)$$

The last condition need be satisfied only at the resonant frequency:

$$\omega_0 = \frac{1}{\sqrt{C_1 L_1}} = \frac{1}{\sqrt{C_2 L_2}} \qquad (19)$$

From Equations (17) and (19) and the conditions stated it follows that:

$$1 = \omega_0 L_1 g_{12} = g_{12} \sqrt{\frac{L_1}{C_1}} \qquad (20)$$

The action of bidirective coupling alone between a pair of tuned circuits is comparable with conventional feedback from the output to the input of a vacuum tube translating circuit but is unique in that it is degenerative at the resonant frequency of the terminal circuits and regenerative at frequencies substantially above and below the resonant frequency. The resonance curve is symmetrical since the effect of the feedback is the same at frequencies displaced equally on either side of the resonant frequency. In either of the two described modifications of Fig. 4, if the conditions for equality of forward and backward couplings are not satisfied, the coupling coefficients and the ratios to optimum coupling still have the expressions given above. The coupling, however, becomes directive with respect to power transfer.

Two means are provided in the circuit of Fig. 4 whereby the magnitude of the unidirective coupling may be adjusted; one of these means comprising the bias adjusting circuits for the control electrodes of the tubes 33 and 34 and the other of these means comprising the adjustable resistors 38 and 38' included respectively in the output and input circuits 32 and 31. One form of adjustable resistor well suited for use as the elements 38 and 38' is a lamp having a positive temperature coefficient of resistance such that the resistance value may be varied by adjusting an auxiliary heating current flowing therein. This form of resistor usually possesses sufficient thermal inertia to prevent variations in the resistance thereof with the high-frequency variations of the signal current flowing therein. Irrespective of whether directive coupling alone or directive coupling in conjunction with nondirective mutual reactance is used, exact equivalence to nondirective mutual reactance is only maintained when the unidirective forward and backward couplings are adjusted equally. This means that if $R_1$ and $R_2$ are to be adjusted to vary the coupling they must be adjusted in direct proportion if the conditions for equivalence to mutual reactance are to be satisfied without variation of other quantities. Such variation of resistances $R_1$ and $R_2$ permits altering the width of the frequency transmission band without otherwise altering its shape or the transfer admittance at the mean frequency because changes in coupling caused by the reactance changes are accompanied by like changes in the damping of the tuned terminal circuits 10 and 11. This result requires that the two circuits be in tune and have negligible dissipation in the inductive and capacitive elements thereof.

If the self-reactance elements of the terminal circuits 31 and 32 have appreciable resistance, the coupling should be increased proportionately by means independent of the resistors 38 and 38'. This may be done by adjusting the transconductances of the tubes 33 and 34 or by coupling the circuits nondirectively as shown at 37 and making the non-directive coupling adjustable.

Since the mutual reactance coupling between the terminal circuits 31 and 32 of Fig. 4 may readily be adjusted to vary the frequency-response characteristic of the system by either of the two expedients mentioned above, the system of this figure is particularly suited for use as an adjustable band-pass selector system. The fact that the amount of coupling may easily be varied by adjusting the bias voltage applied to the control electrodes of the tubes 33 and 34 renders the arrangement particularly useful as a means subject to automatic control to vary the selectivity of the intermediate-frequency channel of a superheterodyne radio receiver. In the application named, it is desirable to adjust the width of the frequency band transmitted through the intermediate-frequency channel without changing the transfer admittance between the terminal circuits at the mean resonant frequency, or otherwise altering the shape of the frequency-response characteristic. To make the system conform to these requirements, it is necessary that the damping of at least one of the circuits 31 and 32 be increased as the coupling between the circuits is increased and vice versa. Such adjustment of the damping in the proper direction may be secured in the manner described above by simultaneously and proportionately varying the resistance values of the resistors 38 and 38'.

Referring now more particularly to Fig. 5, there is shown another embodiment of the invention employing tuned terminal circuits in which the damping of the circuits is determined by the plate conductance of the unidirective coupling tubes. The arrangement of Fig. 5 is fundamentally the same as that of Fig. 4 with the inductance and resistance elements interchanged. In the circuit of this figure, the input and output circuits 31 and 32 are coupled by unidirective coupling means including tubes 47 and 48. These tubes are of the three-electrode type having anode-cathode conductance proportional to the transconductance thereof and a substantial amount of grid-anode capacitance indicated by the dotted-line condensers 56 and 57, respectively. Resistors 49 and 50 are included in the coupling paths between the input circuit 31 and the input electrodes of the tube 47 and the output circuit 32 and the input electrodes of the tube 48, respectively. The coupling path between the output electrodes of the tube 47 and the output circuit 32 also includes the mutual reactance between a pair of inductively coupled inductors 51 and 52. Similarly, the coupling path between the input circuit 31 and the output electrodes of the tube 48 also includes the mutual reactance between inductively coupled inductors 53 and 54. Fixed nondirective mutual inductance between the circuit elements 52 and 53 is indicated by the curved arrow 55 while there is an appreciable nondirective incidental admittance coupling between the circuits 31 and 32 provided by the grid-anode capacitance of the tubes 33 and 34. The means for adjusting the forward and backward couplings between the circuits 31 and 32 comprises the same elements as are described above in connection with the circuit of Fig. 4.

With the system of Fig. 5, the physical operation of the unidirective coupling means comprising the tubes 47 and 48, to supplement the fixed mutual inductive reactance provided by the coupling 55 between the elements 52 and 53, is attained in the manner similar to that described above in connection with the circuit of Fig. 4. It is pointed out, however, that the desired quadrature phase relation between the current through the resistor 49 and the voltage introduced in the output circuit 32 is procured by the mutual inductance between the elements 51 and 52 rather than by the self-reactance of a single reactance element. Similarly, the mutual inductance between the elements 53 and 54 provides a quadrature phase relation between the current through the resistor 50 and the voltage introduced in the input circuit 31.

The coefficient of coupling, neglecting the leakage reactance of the inductors connected to the output electrodes of the tubes, is given by the equation:

$$k = \frac{M - \sqrt{R_1 R_2 g_{12} g_{21} M_1 M_2}}{\sqrt{L_1 L_2}} \qquad (21)$$

where:

$M$ = mutual inductance 55 between elements 52 and 53.
$M_1$ = mutual inductance 55 between elements 53 and 54.
$M_2$ = mutual inductance 55 between elements 51 and 52.
$L_1$ = self-inductance of element 53.
$L_2$ = self-inductance of element 52.
$R_1$ = resistance of element 49.
$R_2$ = resistance of element 50.
$g_{12}$ = transconductance of tube 47.
$g_{21}$ = transconductance of tube 48.

The mutual inductance and the coupling between the circuits provided by the tubes 47 and 48 are additive when the former is negative in accordance with ordinary conventions and the manner in which the circuit is shown in the drawing. In this connection it is to be noted that the polarity of the mutual inductance may be adjusted to aid or oppose the vacuum tube coupling in any case, as desired.

If it be desired to operate the system of Fig. 5 to secure an expansion of the frequency transmission band width without otherwise changing the shape of the resonance curve, increases of the coefficient of coupling must be accompanied by proportionate increases of the damping of the terminal circuits 31 and 32. Such changes in damping may be secured by utilizing the anode-cathode conductance of the tubes coupled to the circuits to a sufficient extent to have a substantial effect on their damping. The values of output conductance vary proportionately with the values of transconductance and the coefficient of coupling varies in the same proportion if the transconductances of both tubes are simultaneously varied. The purpose of providing the coupled inductors 51, 52, 53, and 54 is to obtain an arrangement wherein the effectiveness of the tube conductance to determine the damping of the associated terminal circuits may be adjusted. Thus, the effect of the conductance of tube 47 on the damping of the circuit 32 is determined by the value of $M_1$ and, similarly, the effect of the conductance of tube 34 on the damping of the circuit 31 is determined by the value of $M_2$. It is not essential to increase the damping of both circuits with increased coupling if the shape of the resonance curve need not be maintained exactly the same. In such cases, unlike tubes or unequal forward and backward coupling may be employed such that only one of the tubes contributes substantially to the damping of only one of the tuned terminal circuits 31 or 32.

Vacuum tubes of the type having the desired relation between anode-cathode conductance and transconductance as outlined above are usually characterized by a considerable interelectrode capacitance such that the above-noted incidental nondirective coupling exists between the coupled circuits. This coupling may cause a decided dissymmetry of the frequency transmission curve of the system or oscillation or both. In order to neutralize this coupling, there is provided a resistor 9 connected between the anodes of the tubes 47 and 48 and having conductance $G_3$ providing non-directive coupling between the terminal circuits opposite in phase to the capacitive coupling through the capacitances 56 and 57. The condition for complete neutralization of the capacitive coupling is given by the equation:

$$G_3 = \frac{C_3 R_1}{M_1} + \frac{C_4 R_2}{M_2} \qquad (22)$$

where:

$C_3$ = capacitance 56.
$C_4$ = capacitance 57.

The derivation of the above equation is based on the following assumptions which are usually valid in connection with sharply tuned terminal circuits:

$$R_1 << \omega L_1; R_2 << \omega L_2; C_3 << C_2; C_4 << C_1;$$

$$1 - k_1^2 << 1; 1 - k_2^2 << 1 \qquad (23)$$

where:

$k_1$ = coefficient of coupling between elements 53 and 54.
$k_2$ = coefficient of coupling between elements 51 and 52.
$C_1$ = capacitance of the tuning condenser of circuit 31.
$C_2$ = capacitance of the tuning condenser of circuit 32.

The behavior of this neutralization depends on the phase relations which are inherent when vacuum tubes are used to secure the equivalent of mutual reactance between the circuits. These phase relations cause transconductance to appear as mutual reactance and capacitive coupling to appear as conductive coupling. Therefore, the latter may be neutralized by the addition of conductance between voltage points of the terminal circuits of proper phase and polarity which, in the arrangement described, comprises points of the terminal circuits having voltages differing in phase by 90 degrees. In effect, the conductance element 9 completes two bridge circuits, one of which comprises the elements 49, 53—54, 9, and 56 and the other of which comprises the elements 51—52, 50, 57, and 9 with the result that the currents flowing through the capacitances of condensers 56 and 57 are by-passed with respect to the elements 54 and 51. The resulting neutralization is independent of frequency as is indicated by Equation (22). It is thus seen that capacitance $C_3$ effectively couples the voltage appearing across resistance 49 from circuit 31 across inductance 51 in the output circuit and that resistance 9 effectively couples the voltage across inductance 54 in circuit 31, which is in quadrature with the voltage across resistance 49, across inductance 51 in the output circuit. The voltages from input circuit 31, therefore, are in quadrature phase relation and are coupled to the output circuit 32 across portions thereof having voltages thereacross of the same phase. The coupling admittances of condenser C₃ and resistance 9 have a quadrature phase relationship.

While the method of neutralization described above is particularly adapted for use in the arrangement illustrated, it will be understood that similar embodiments thereof may be used in various modifications of the bidirective coupling system shown to prevent incidental nondirective coupling through the coupling tubes.

Referring now more particularly to Fig. 6 of the drawings, there is shown a modification of the invention in which the coefficient of coupling is not necessarily the same at all frequencies for a given set of circuit values, the desired phase relations between the voltages and currents in the input and output circuits being secured by phase-shifting means external to the coupled circuits but included in the coupling paths between the input and output electrodes of the coupling tubes and the associated terminal circuits. This modification comprises tuned input and output circuits 58 and 59 coupled in the forward and backward directions by unidirective coupling means comprising the vacuum tubes 61 and 62, respectively. These tubes are shown as unshielded triodes, although they may be of any other form particularly suited to a desired application. Since the mode of connecting the control circuits and anode voltage sources has been adequately described above, these elements have been omitted for the purpose of simplifying the drawings. The phase-shifting means, cooperating with each of the forward and backward coupling means, is illustrated as being divided between the input and output coupling paths of the respective tubes. Thus, a resistor 63 is connected between the input electrodes of the tube 61 and in series with a condenser 64 across the terminals of the circuit 58. A second series circuit comprising a resistor 65 and a condenser 66 is connected across the terminals of the output circuit 59 with the resistor connected between the output electrodes of the tube 61. The backward coupling path likewise includes two phase-shifting circuits comprising, respectively, a resistor 67 and condenser 68, and a resistor 69 and condenser 70 included, respectively, in the coupling path between the output circuit 59 and the input electrodes of the tube 62 and the coupling path between the output electrodes of the tube 62 and the input circuit 58.

The circuit constants of the four phase-shifting circuits are so proportioned that in the operation of the system the phase relations between the voltages and currents in the terminal circuits are the same as would be provided by mutual inductive reactance coupling between the circuits. This equivalence to mutual reactance coupling is realized when the total phase shift provided in the forward coupling path is such that the voltage produced across the output circuit, due to the unidirective forward coupling means, is in phase quadrature with the voltage across the input circuit 58. This necessitates a 90 degree voltage phase shift in the two phase-shifting circuits included in the forward coupling path. A similar total voltage phase shift of 90 degrees is required in the two phase-shifting circuits included in the backward coupling path. For certain applications, a sufficient approximation to a 90 degree phase shift for satisfactory operation may be obtained by one resistor-condenser combination in each of the forward and backward coupling paths. With the two resistor-condenser combinations in each path, however, an exact 90 degree phase shift may be obtained for any given frequency, and a phase shift of approximately 90 degrees may be obtained over any narrow range of frequencies of interest in the operation of a pair of fairly sharply tuned terminal circuits.

Preferably the impedance values of the phase-shifting circuits are proportioned in the following manner. In the anode circuit of each tube there are included elements having a relatively small value of resistance and capacitance, respectively, to secure a phase shift of nearly a right angle and to minimize the damping of the associated terminal circuit by the resistance. In the input circuit of each tube there are included elements having large values of resistance and capacitance, respectively, to secure the required additional phase shift without substantially affecting the damping of the associated tuned circuit. In general, the effect on the damping is greatest when the phase displacement is equally divided between the grid and plate circuits of the tubes. Therefore, this condition is permissible only when the increase of damping is tolerable. A further advantage in proportioning the circuit constants of the phase-shifting circuits in the manner suggested above resides in the fact that the coefficient of coupling between the terminal circuits is rendered substantially independent of frequency.

Figure 8:
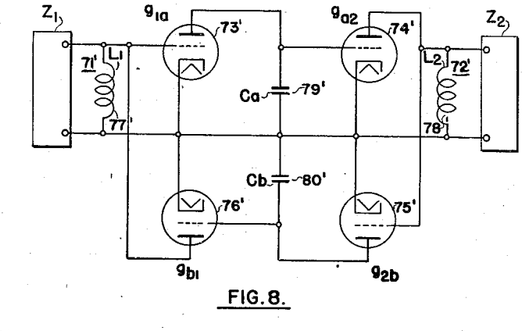
Figure 9:
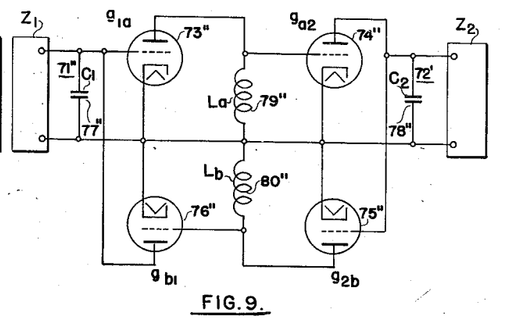

Referring now more particularly to Figs. 7, 8, and 9 of the drawings, there are shown circuit arrangements for securing the equivalent of simple mutual reactance without adding resistance in the circuits to be coupled. The generalized arrangement of Fig. 7 includes input and output circuits 71 and 72, respectively, coupled in the forward direction by unidirective nondissipative means including cascade coupled vacuum tubes 73 and 74 and in the backward direction by unidirective nondissipative coupling means including cascade coupled vacuum tubes 75 and 76. The input electrodes of the tube 73 and the output electrodes of the tube 76 are directly coupled to the input circuit 71 across a reactance element 77 forming a branch of this circuit; and, similarly, the input electrodes of the tube 75 and the output electrodes of the tube 74 are directly coupled to the output circuit 72 across a reactance element 78. In order to simulate mutual reactance between the terminal circuits, the forward coupling tubes are coupled by means of a reactance element 79 and the backward coupling tubes are coupled by a reactance element 80.

In the operation of the coupling system of Fig. 7, the enumerated reactance elements included in the indicated coupling paths are effective to provide the same phase relations between the voltages and currents in the terminal circuits 71 and 72 as would be provided by mutual reactance therebetween. Thus, the effect of the reactance element 79 is to cause the desired 90 degree phase displacement between the current through the reactance element 77 and the voltage introduced in the output circuit across the reactance element 78. Similarly, the element 80 provides a quadrature phase relation between the current in the element 78 and the voltage introduced in the input circuit across the reactance element 77. The effective values of mutual reactance in the forward and backward directions are:

$$X_{12} = X_1 g_{1a} X_a g_{a2} X_2 \quad (24)$$

$$X_{21} = X_2 g_{2b} X_b g_{b1} X_1 \quad (25)$$

where:
$X_{12}$ = mutual reactance in the forward direction.
$X_{21}$ = mutual reactance in the backward direction.
$X_1$ = self-reactance of element 77.
$X_2$ = self reactance of element 78.
$X_a$ = self-reactance of element 79.
$X_b$ = self-reactance of element 80.
$g_{1a}$ = transconductance of tube 73.
$g_{a2}$ = transconductance of tube 74.
$g_{2b}$ = transconductance of tube 75.
$g_{b1}$ = transconductance of tube 76.

The condition for complete equivalence to nondirective mutual reactance $X_m$ is:

$$g_{1a} X_a g_2 = g_{2b} X_b g_{b1} \quad (26)$$

$$X_m = X_{12} = X_{21} = X_1 X_2 \sqrt{X_a X_b g_{1a} g_{a2} g_{2b} g_{b1}} \quad (27)$$

The coefficient of coupling is given by the equation:

$$k = \frac{X_m}{\sqrt{X_1 X_2}} = \sqrt{X_1 X_2 X_a X_b g_{1a} g_{a2} g_{2b} g_{b1}} \quad (28)$$

This coefficient is not necessarily independent of frequency. Its definition requires that elements 77 and 78 be reactance elements of the same type. A coefficient of coupling $k$ which is substantially independent of frequency, therefore, requires that elements 79 and 80 comprise reactance of the other type so that the product $X_1 X_2 X_a X_b$ is constant.

A specific example of the general arrangement of Fig. 7 is shown in Fig. 8, in which primes have been added to the reference numerals to distinguish the elements thereof from the corresponding elements of Fig. 7. In the circuit of Fig. 8, nondirective mutual reactance between the terminal circuits, equivalent to simple inductive coupling between the elements 77' and 78', is obtained by satisfying the condition:

$$\frac{g_{1a} g_{a2}}{C_a} = \frac{g_{2b} g_{b1}}{C_b} \quad (29)$$

The coefficient of coupling is:

$$k = \frac{L_1 L_2 g_{1a} g_{a2} g_{2b} g_{b1}}{C_a C_b} \quad (30)$$

where:
$L_1$ = inductance of element 77'.
$L_2$ = inductance of element 78'.
$C_a$ = capacitance of element 79'.
$C_b$ = capacitance of element 80'.

This coefficient is independent of frequency and may be varied by proportionate variation of one or both of the conductances effective in either direction or by proportionate variation of both condensers 79' and 80'. It will be observed that, with this arrangement, the equivalent of variable mutual inductance is obtained by means including variable capacitance, without affecting the self-reactance of the coupled circuits 71' and 72', per se.

Another specific example of the circuit of Fig. 7 is shown in Fig. 9 wherein the same circuit arrangement is employed. Double primes have been added to the reference characters in order to distinguish the elements thereof from those of Figs. 7 and 8. In this example, coupling equivalent to simple nondirective capacitive coupling is obtained by satisfying the condition:

$$L_a g_{1a} g_{a2} = L_b g_{2b} g_{b1} \quad (31)$$

The coefficient of coupling is:

$$k = \sqrt{\frac{L_a L_b g_{1a} g_{a2} g_{2b} g_{b1}}{C_1 C_2}} \quad (32)$$

where:
$C_1$ = capacitance of condenser 77''.
$C_2$ = capacitance of condenser 78''.
$L_a$ = inductance of inductor 79''.
$L_b$ = inductance of inductor 80''.

With this arrangement, also, the equivalent of variable mutual capacitance is obtained without affecting the self-reactance of the circuits to be coupled.

Figure 10:
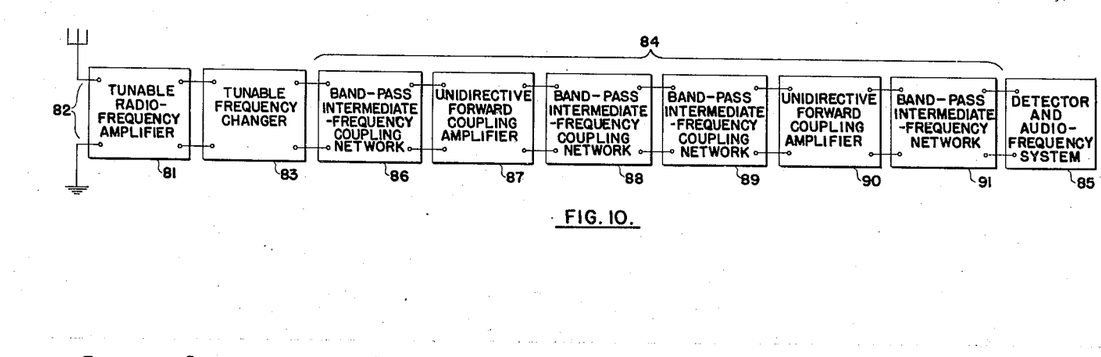
Fig. 10 illustrates schematically the use of a plurality of any one of the embodiments of the invention in a radio receiver of the superheterodyne type.

Referring now to Fig. 10 of the drawings, there is schematically illustrated an embodiment of the invention in a radio broadcast receiver of the superheterodyne type. The receiver comprises a tunable radio-frequency amplifier 81 having its input circuit coupled to an antenna-ground circuit 82 and its output circuit coupled to the input circuit of a tunable frequency changer 83. Coupled in cascade with the frequency changer 83 are the band-pass intermediate-frequency coupling networks and unidirective forward coupling intermediate-frequency amplifiers, indicated collectively by the bracket 84, and the signal detector, audio-frequency amplifier stages and sound reproducer, indicated schematically at 85.

Neglecting for the moment the nature of the intermediate-frequency selector networks, the system described above comprises a conventional superheterodyne receiver, the operation of which is well understood in the art. Briefly, a desired signal modulated-carrier wave intercepted by the antenna-ground circuit 82 is selected and amplified in the tunable radio-frequency amplifier 81, converted into modulated intermediate-frequency carrier currents by the frequency changer 83, further selected and amplified by the band-pass coupling networks and unidirective forward coupling amplifiers indicated generally at 84, and supplied to the audio detector included in the audio-frequency system 85. The detected signal-frequency components are amplified and supplied to a sound reproducer included in the system 85 for reproduction.

Referring to the details of the intermediate-frequency channel of the receiver indicated by the bracket 84, the channel includes therein, coupled in cascade, a band-pass intermediate-frequency coupling network 86, a unindirective forward coupling intermediate-frequency amplifier, a pair of band-pass intermediate-frequency coupling networks 88 and 89, a second unidirective forward coupling amplifier 90, and a fourth band-pass intermediate-frequency coupling network 91. Each of the four coupling networks 86, 88, 89, and 91 may comprise any one of the modifications of the invention described above, if provided with tuned input and output circuits. Thus, the arrangement of Fig. 6 may be connected in the system by connecting the terminals thereof to the proper connections between the units shown. The two coupling networks 88 and 89 in cascade constitute a multiple section band-pass filter.

It will be understood that the selectivity of the receiver of Fig. 10 is primarily determined by the selectivity characteristic of the four coupling networks and that it may be adjusted either automatically or manually by simultaneously adjusting the unidirective coupling means to vary in the desired sense the couplings between the individual terminal circuits of the four networks. Such adjustment may be accomplished by any one or more of the methods described in connection with the circuits of Figs. 4 and 5, but preferably is accomplished by the described method of varying the transconductances of the coupling tubes.

While there have been described what are at present considered to be the preferred embodiments of the invention, it will be understood that various changes and modifications may be made therein without departing from the invention, and it is contemplated in the appended claims to cover all such changes and modifications as fall within the true spirit and scope of the invention.

What is claimed is:

1. An electric coupling system comprising input and output circuits, separate unidirective nondissipative coupling means coupling said circuits individually in the forward and backward directions, at least one of said means comprising a pair of vacuum tubes coupled in cascade between said circuits, and means including reactance included in the coupling path between said pair of tubes cooperating with said unidirective coupling means to provide phase relations between the voltages and currents in said circuits equivalent to those which would be provided by mutual reactance between said circuits.

2. An electric coupling system comprising input and output circuits, separate unidirective nondissipative coupling means coupling said circuits individually in the forward and backward directions, at least one of said means comprising a pair of vacuum tubes coupled in cascade between said circuits, and means including capacitance included in the coupling path between said pair of tubes cooperating with said unidirective coupling means to provide phase relations between the voltages and currents in said circuits equivalent to those which would be provided by inductive mutual reactance between said circuits.

3. An electric coupling system comprising input and output circuits, separate unidirective coupling means each coupled to both of said circuits, individually coupling said circuits in the forward and backward directions, respectively, and each incidentally coupling said circuits in both directions, means for neutralizing said incidental coupling, and means cooperating with said unidirective coupling means to provide phase relations between the voltages and currents in said circuits equivalent to those which would be provided by mutual reactance between said circuits.

4. An electric coupling system comprising input and output circuits, separate means each coupled to both of said circuits and having incidental nondirective susceptance coupling said circuits in both directions and unidirective transconductance coupling said circuits respectively in the forward and backward directions, conductance means coupling said circuits to neutralize said incidental nondirective coupling between said circuits, and means included in the coupling paths between said circuits and said coupling means and cooperating with said coupling means to provide phase relations between the voltages and currents in said circuits equivalent to those which would be provided by nondirective mutual reactance between said circuits.

5. An electric coupling system comprising input and output circuits, unidirective coupling means coupling said circuits primarily in one direction only and incidentally coupling said circuits in both directions, and neutralizing means, said two means providing individually nondirective coupling admittances between said circuits each effectively coupling a voltage from one of said circuits into the other of said circuits, said voltages coupled from said one of said circuits being in quadrature phase relationship and said voltages being coupled across portions of the other of said circuits having voltages of the same phase, and said admittances being also in quadrature phase relation and being proportioned in value substantially to neutralize said incidental coupling.

6. An electric coupling system comprising input and output terminals, at least one impedance element connected betwen said input terminals, at least one impedance element connected between said output terminals, separate unidirective nondissipative coupling means coupling said elements individually in the forward and backward directions, at least one of said means comprising a pair of vacuum tubes coupled in cascade between said elements, and means cooperating with said unidirective coupling means to provide phase relations between the voltages and currents in said elements equivalent to that which would be provided by mutual reactance between said circuits, said means including reactance included in the coupling path between said pair of tubes.

HAROLD A. WHEELER.